US011506020B2

(12) United States Patent
Dusterhoft et al.

(10) Patent No.: US 11,506,020 B2
(45) Date of Patent: Nov. 22, 2022

(54) TEXTURED RESILIENT SEAL FOR A SUBSURFACE SAFETY VALVE

(71) Applicant: Halliburton Energy Services, Inc., Houston, TX (US)

(72) Inventors: Ross Glen Dusterhoft, Carrollton, TX (US); Shaun Wen Jie Ng, Singapore (SG); James Dan Vick, Jr., Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/213,668

(22) Filed: Mar. 26, 2021

(65) Prior Publication Data

US 2022/0307347 A1    Sep. 29, 2022

(51) Int. Cl.
*E21B 34/10* (2006.01)
*E21B 34/14* (2006.01)
*F16K 1/20* (2006.01)
*F16K 25/00* (2006.01)

(52) U.S. Cl.
CPC ............ *E21B 34/101* (2013.01); *E21B 34/10* (2013.01); *E21B 34/14* (2013.01); *F16K 1/2057* (2013.01); *F16K 25/00* (2013.01); *E21B 2200/01* (2020.05); *E21B 2200/05* (2020.05)

(58) Field of Classification Search
CPC ......... Y10T 137/7868; Y10T 137/0396; F16K 1/205; F16K 1/2263; E21B 34/101; E21B 2200/05
See application file for complete search history.

(56) References Cited

U.S. PATENT DOCUMENTS

| 3,986,699 | A | | 10/1976 | Wucik, Jr. et al. |
| 4,513,946 | A | * | 4/1985 | Priese ................... F16K 1/2285 251/173 |
| 5,263,847 | A | | 11/1993 | Akkerman et al. |
| 7,401,763 | B2 | | 7/2008 | Hartman et al. |
| 7,841,416 | B2 | * | 11/2010 | Henschel ................ E21B 34/10 166/386 |
| 8,522,878 | B2 | | 9/2013 | Noske et al. |
| 10,024,132 | B2 | | 7/2018 | Clemens et al. |

(Continued)

FOREIGN PATENT DOCUMENTS

WO    2013-184737    12/2013

OTHER PUBLICATIONS

International Search Report and Written Opinion for Application No. PCT/US2021/026019, dated Dec. 14, 2021.

*Primary Examiner* — James G Sayre
(74) *Attorney, Agent, or Firm* — Scott Richardson; C. Tumey Law Group PLLC (57) ABSTRACT

A resilient seal includes an annular body portion and a seating surface defined by the annular body portion and configured to interface with a seat of a subsurface safety valve. The resilient seal further includes a plurality of sealing surfaces defined by the annular body portion. Each sealing surface of the plurality of sealing surfaces is positioned to interface with a flapper of the subsurface safety valve in a closed position of the flapper of the subsurface safety valve. Additionally, the resilient seal includes at least one annular channel defined by the annular body portion between adjacent sealing surfaces of the plurality of sealing surfaces.

17 Claims, 6 Drawing Sheets

(56) References Cited

U.S. PATENT DOCUMENTS

| | | |
|---|---|---|
| 2005/0029483 A1* | 2/2005 | Bancroft ............... F16J 15/164 251/306 |
| 2005/0087335 A1 | 4/2005 | Vick, Jr. |
| 2005/0269103 A1 | 12/2005 | Vick, Jr. |
| 2009/0078418 A1 | 3/2009 | Dusterhoft |
| 2009/0078419 A1 | 3/2009 | Dusterhoft |
| 2009/0314979 A1* | 12/2009 | McIntire ............... F04B 53/102 251/334 |
| 2010/0051260 A1 | 3/2010 | Vick, Jr. et al. |
| 2010/0307758 A1 | 12/2010 | Vick, Jr. et al. |
| 2011/0240299 A1 | 10/2011 | Vick, Jr. et al. |
| 2012/0032099 A1 | 2/2012 | Vick, Jr. |
| 2012/0125597 A1 | 5/2012 | Vick, Jr. et al. |
| 2012/0146805 A1 | 6/2012 | Vick, Jr. et al. |
| 2012/0261139 A1 | 10/2012 | Williamson, Jr. et al. |
| 2013/0098631 A1 | 4/2013 | Vick, Jr. |
| 2013/0175025 A1 | 7/2013 | Vick, Jr. et al. |
| 2013/0199795 A1 | 8/2013 | Williamson et al. |
| 2013/0206389 A1 | 8/2013 | Vick, Jr. et al. |
| 2014/0000870 A1 | 1/2014 | Vick, Jr. et al. |
| 2014/0020887 A1 | 1/2014 | Vick, Jr. et al. |
| 2014/0083712 A1 | 3/2014 | Vick et al. |
| 2014/0096978 A1 | 4/2014 | Giusti, Jr. et al. |
| 2015/0123808 A1 | 5/2015 | Vick, Jr. et al. |
| 2015/0191995 A1 | 7/2015 | Vick, Jr. |
| 2015/0198033 A1 | 7/2015 | Vick, Jr. |
| 2015/0218907 A1 | 8/2015 | Vick, Jr. |
| 2015/0233209 A1 | 8/2015 | Vick, Jr. |
| 2016/0123115 A1 | 5/2016 | Scott et al. |
| 2016/0258250 A1 | 9/2016 | Vick, Jr. et al. |
| 2016/0265309 A1 | 9/2016 | Vick, Jr. |
| 2016/0273304 A1 | 9/2016 | Vick, Jr. et al. |
| 2017/0226823 A1 | 8/2017 | Ng |
| 2020/0032616 A1 | 1/2020 | Vick, Jr. et al. |
| 2020/0308932 A1 | 10/2020 | Vick, Jr. |
| 2020/0340330 A1 | 10/2020 | Vick, Jr. |
| 2020/0355043 A1 | 11/2020 | Vick, Jr. et al. |

* cited by examiner

TEXTURED RESILIENT SEAL FOR A SUBSURFACE SAFETY VALVE

BACKGROUND

During production operations of a wellbore, crude oil may flow upward through production tubing and/or casing to the surface. To control flow in the event of a well failure, a subsurface safety valve (SSSV) may be mounted to production tubing or casing installed downhole in the wellbore. The subsurface safety valve may be configured to close automatically in response to a predetermined flow condition (e.g., pressure differential/flow velocity across the subsurface safety valve) indicative of well failure. Closing the subsurface safety valve includes moving a flapper of the subsurface safety valve from an open position to a closed position to block the flow in the production tubing and/or casing. In particular, the flapper may rotate about a hinge to contact a seat of the subsurface safety valve. A seal of the subsurface safety valve is generally disposed between the seat and the flapper in the closed position to prevent the flow from passing between the flapper and the seat.

However, during production operations, sand may also flow upward through the production tubing and/or casing to the surface such that the upward flow includes a mixture of crude oil and sand. Unfortunately, sand particles may become trapped between the flapper and the seal and/or between the seal and the seat when the flapper closes, which may compromise the seal and allow the mixture to continue to flow across the seal adjacent the trapped sand particle(s). Such flow may cause the seal to fail and compromise the effectiveness of the subsurface safety valve. Specifically, such flow may have an increased flow velocity across the seal adjacent the trapped sand particle(s) due to the reduced cross-sectional area of the flow as it passes across the seal. As the mixture of sand and crude oil continues to flow across the seal at the increased flow velocity, the sand may abrade portions of the seal exposed to the flow. Such abrasive may continue to wear the seal, which may increasingly compromise the effectiveness of the subsurface safety valve.

BRIEF DESCRIPTION OF THE DRAWINGS

These drawings illustrate certain aspects of some of the embodiments of the present disclosure and should not be used to limit or define the method.

DETAILED DESCRIPTION

Provided are resilient seals for a subsurface safety valve. Example embodiments may include textured resilient seals configured to seal a flapper against a seat of the subsurface safety valve. The textured resilient seals may be configured to maintain a seal even when sand or other debris is positioned between the resilient seal and the flapper and/or seat, such that the subsurface safety valve may effectively and reliably operate in wellbore production operations.

Figure 1:
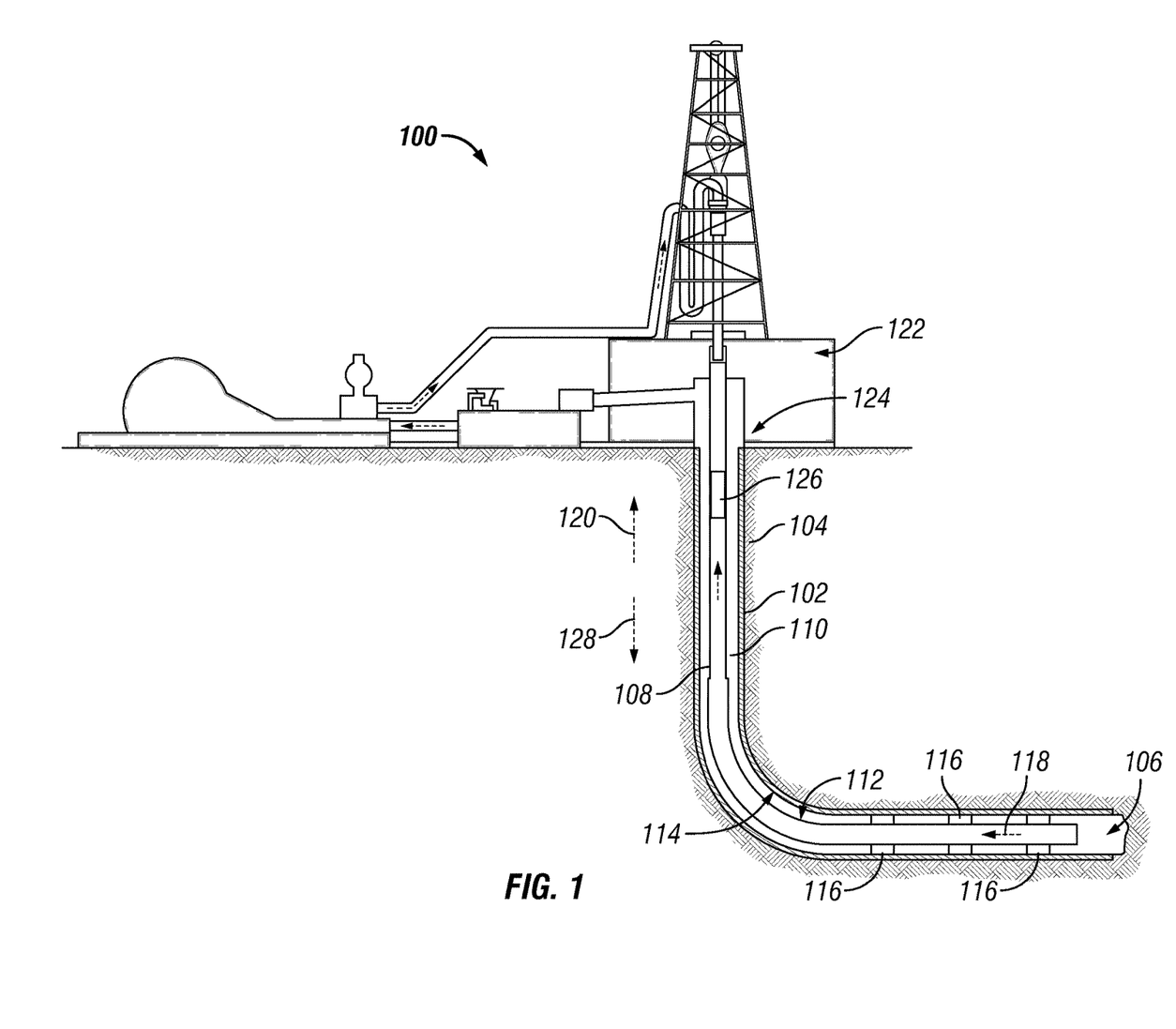
FIG. 1 is an elevation view of a production operation for a wellbore.

FIG. 1 is an elevation view of a production operation for a wellbore, as an example in which embodiments of the present disclosure may be implemented. It should be noted that while FIG. 1 generally depicts a land-based production operation, those skilled in the art will readily recognize that the principles described herein are equally applicable to subsea production operations that employ floating or sea-based platforms and rigs, without departing from the scope of the disclosure. As illustrated, the production operation 100 includes production casing 102 installed to support wellbore walls 104 of the wellbore 106. Further, production tubing 108 is installed interior to the production casing 102 such that an annulus 110 is formed between an outer surface 112 of the production tubing 108 and an inner surface 114 of the production casing 102. In the illustrated embodiment, packers 116 may be positioned in the annulus 110 to seal the production tubing 108 to the production casing. 102 such that production fluid 118 (e.g., crude oil and gas) is directed in an uphole direction 120 through the production tubing 108. A production tree 122 (e.g., surface tree, subsea tree) may be positioned proximate a wellhead 124 of the wellbore 106 to control the flow of the production fluid 118 out of the wellbore 106. A subsurface safety valve 126 may be disposed downhole 128 from the production tree 122 to stop upward flow of the production fluid 118 in the event of a well failure and help prevent uncontrolled flowing production fluid 118, such as gas or other hydrocarbons, which may cause explosions or otherwise damage surface facilities and/or cause environmental damage in the event of a well failure.

Figure 2A:
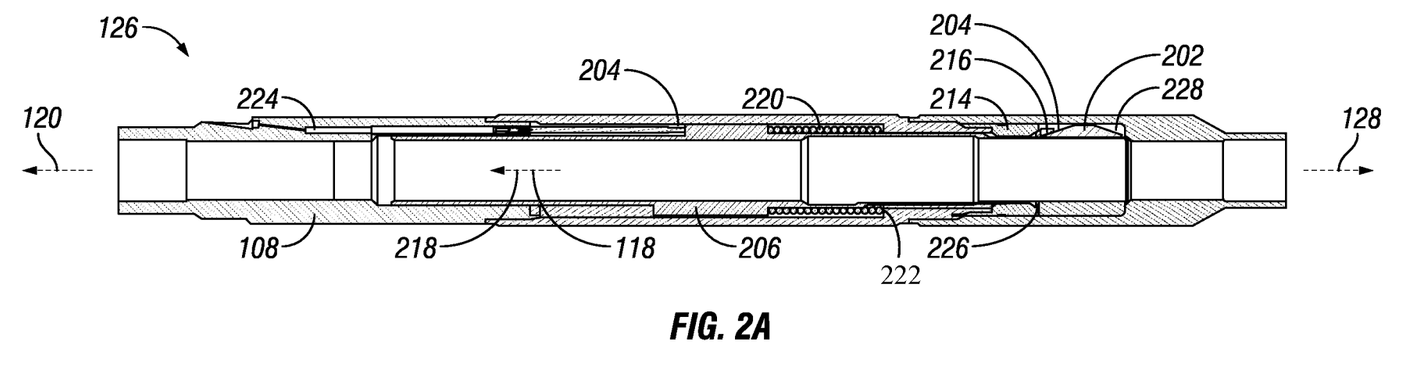
FIG. 2A is a cross-sectional view of a subsurface safety valve for the production operation with the subsurface safety valve open.

FIG. 2A is a cross-sectional view of an embodiment of the subsurface safety valve 126 of FIG. 1 in an open state for allowing flow through the subsurface safety valve 126. In the open state, a flapper 202 of the subsurface safety valve 126 is held in an open position. The subsurface safety valve 126 may include a portion of the production tubing 108. As illustrated, the portion of the production tubing 108 may include recesses 204 and/or cavities shaped to house various features of the subsurface safety valve 126. The subsurface safety valve 126 may also include a sleeve 206 disposed within the production tubing 108 and axially moveable with respect to the production tubing 108 to open and close the subsurface safety valve 126. In particular, the sleeve 206 is moveable between a first position, corresponding to the closed state of the subsurface safety valve 126 (FIG. 2B), and a second position, corresponding to the open state of the subsurface safety valve 126 in FIG. 2A. As the sleeve 206 moves from the first position to the second position, the sleeve 206 may move downhole 128 through a valve seat 214 of the subsurface safety valve 126 and contact the flapper 202. As the sleeve 206 continues to move downhole 128 toward the second position, the sleeve 206 may continue to push the flapper 202. The flapper 202 may be secured to the production tubing 108 via a hinge interface 216. Accordingly, as the sleeve 206 moves toward the second position, the flapper 202 may hinge out of a flow path 218 (e.g., central bore) of the production tubing 108 into a flapper cavity 228 of the production tubing 108 configured to receive the flapper 202 (e.g., into the open position of the flapper 202). Thus, in the open position, the flapper 202 may not inhibit flow of the production fluid 118 through the production tubing 108.

As illustrated, the subsurface safety valve 126 also includes a spring 220 (e.g., compression spring). The spring 220 may be disposed between a ledge 222 of the production tubing 108 and a radial protrusion of the sleeve 206. The spring 220 may bias the sleeve 206 in the uphole direction 120, toward the first position, such that the flapper 202 may close. However, the subsurface safety valve 126 includes a control line 224 to provide fluid pressure to bias the sleeve 206 toward the second position, which corresponds to the open position of the subsurface safety valve 126. Thus, to open the subsurface safety valve 126, the control line 224 may provide sufficient fluid pressure to overcome the force exerted on the sleeve 206 by the spring 220 to move the sleeve 206 to the second position. In the illustrated embodiment, the control line 224 is actively providing sufficient fluid pressure to compress the spring 220 and move the sleeve 206 to the second position. In some embodiments, the control line 224 is capable of providing a particular, sufficient amount of fluid pressure based at least on a control system disposed at the surface of the wellbore to move the sleeve 206 to the second position.

Figure 2B:
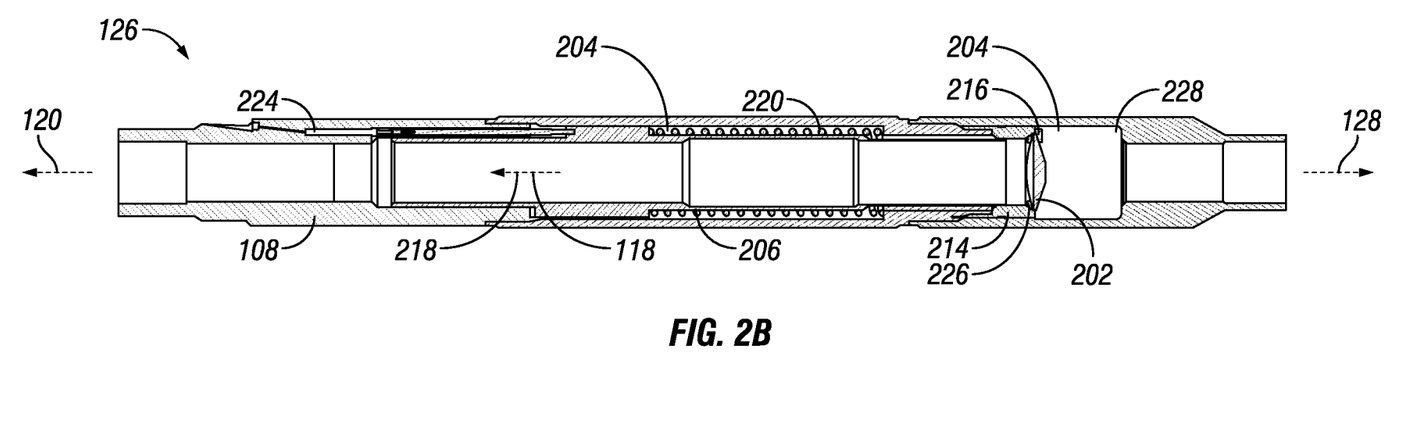
FIG. 2B is a cross-sectional view of the subsurface safety valve when closed.

FIG. 2B is a cross-sectional view of the subsurface safety valve 126 in a closed state for closing flow through the subsurface safety valve 126. The flapper 202 may pivot about its hinge based at least in part on the position of the sleeve 206. The flapper 202 may be alternately opened and closed as needed by fully moving the sleeve 206 between the first and second positions. The subsurface safety valve 126 may normally be in the open state of FIG. 2A to allow production flow. In response to a predetermined flow condition (e.g., pressure differential/flow velocity across the subsurface safety valve 126) resulting from well failure and/or deactivation of the control line 224, the sleeve 206 may move toward the first position to close the subsurface safety valve 126. In particular, as the sleeve 206 moves in the uphole direction 120, the flapper 202 may rotate about its hinge 216 in a direction toward the valve seat 214 and into the flow path 218 of the production tubing 108. As the sleeve 206 reaches the first position, the flapper 202 may move to the closed position against the valve seat 214. In the closed position of the flapper 202, the flapper 202 may contact the valve seat 214 and/or a resilient seal 226 disposed at least partially between the valve seat 214 and the flapper 202.

Figure 3:
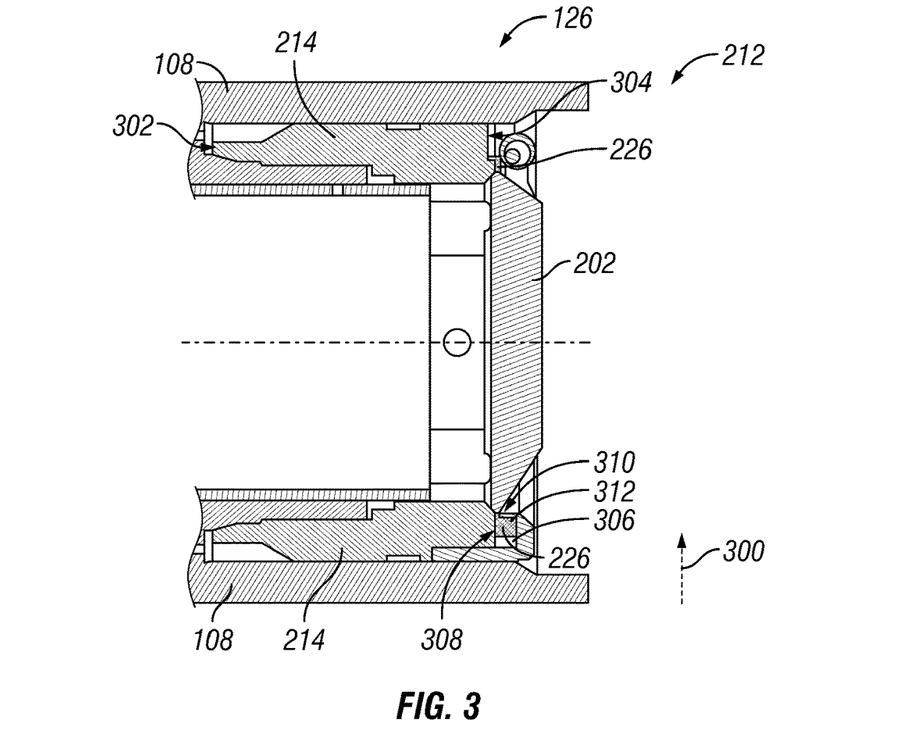
FIG. 3 is a cross-sectional view of a resilient seal disposed between a flapper and a seat of the subsurface safety valve.

FIG. 3 is a cross-sectional view of an embodiment of the resilient seal 226 disposed between the flapper 202 and the valve seat 214 of the subsurface safety valve 126 in the closed position of the flapper. As illustrated, the valve seat 214 may be secured to the production tubing 108 and extend radially inward 300 with respect to the production tubing 108. The valve seat 214 may include a first axial surface 302 and a second axial surface 304 positioned downhole from the first axial surface 302. The second axial surface 304 is positioned to interface with the resilient seal 226 and/or the flapper 202. Further, the second axial surface 304 may be sized and shaped to house the resilient seal 226. Specifically, the second axial surface 304 may include a recess 306, cavity, pocket, etc. to house at least a portion of the resilient seal 226 such that the resilient seal 226 is retained by the valve seat 214 while the subsurface safety valve 126 is disposed in the open position. In the illustrated embodiment, the subsurface safety valve 126 includes the resilient seal 226 housed at the second axial surface 304 of the valve seat 214.

As set forth in greater detail below, the resilient seal 226 may have an annular body portion 312 with a valve seating surface 308 and a plurality of sealing surfaces 310. In some embodiments, the annular body portion 312 may define the valve seating surface 308 and the plurality of sealing surfaces 310. The valve seating surface 308 may interface with the valve seat 214 (e.g., the second axial surface 304 of the valve seat 214). In some embodiments, the valve seating surface 308 may be disposed at least partially within the recess 306, cavity, pocket, etc. defined at the second axial surface 304 of the valve seat 214. Further, each of the plurality of sealing surfaces 310 may interface with the flapper 202 in the closed position.

Figure 4:
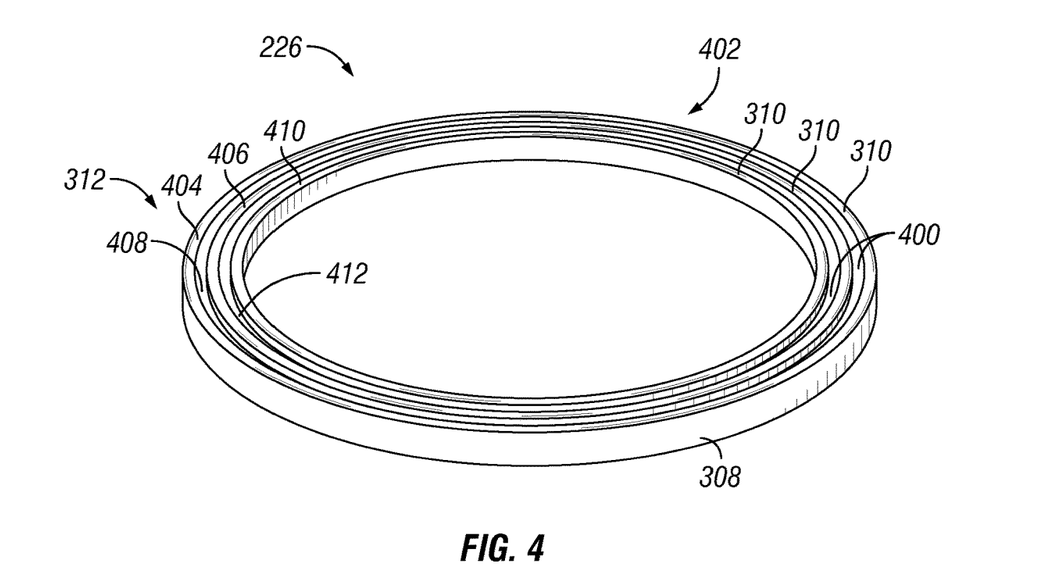
FIG. 4 is a perspective view of a resilient seal of the subsurface safety valve.

FIG. 4 is a perspective view of an embodiment of the resilient seal 226 of the subsurface safety valve 126. The resilient seal 226 may include a Polytetrafluoroethylene (PTFE) material, a Polyether ether ketone (PEEK) material, another suitable material, or combination of materials, formed into an annular body portion 312 via any suitable manufacturing process. The annular body portion 312 may define the valve seating surface 308 and the plurality of sealing surfaces 310, as set forth above. In some embodiments, the annular body portion 312 may be modified to form the plurality of sealing surfaces 310. That is, using any suitable processes (e.g., machining, drilling, milling), at least one annular channel 400 may be formed in a sealing surface 402 by removing a portion of the sealing surface 402, thereby, separating the sealing surface 402 into the plurality of sealing surfaces 310 shown in the illustrated embodiment. Accordingly, the at least one annular channel 400 may be defined by the annular body portion 312 between adjacent sealing surfaces 310 of the plurality of sealing surfaces 310.

In the illustrated embodiment, the annular body portion 312 is modified to include a plurality of radially spaced annular channels 400 in the sealing surface 402. In particular, the annular body portion 312 includes a first sealing surface 404 separated from a second sealing surface 406 via a first annular channel 408, as well as the second sealing surface 406 separated from a third sealing surface 410 via a second annular channel 412. Moreover, each sealing surface of the plurality of sealing surfaces 310 may be an annular sealing surface such that each sealing surface may form a complete radial seal 226 when in contact with the flapper 202 (shown in FIG. 3). The annular body portion 312 may define the plurality of sealing surfaces 310 (i.e., more than one sealing surface) to provide redundant sealing surfaces in the event that one or more of the plurality of sealing surfaces 310 is compromised by sand and/or other debris becoming trapped between the one or more sealing surfaces 310 and the flapper 202 in the closed position (shown in FIG. 3).

Figure 5:
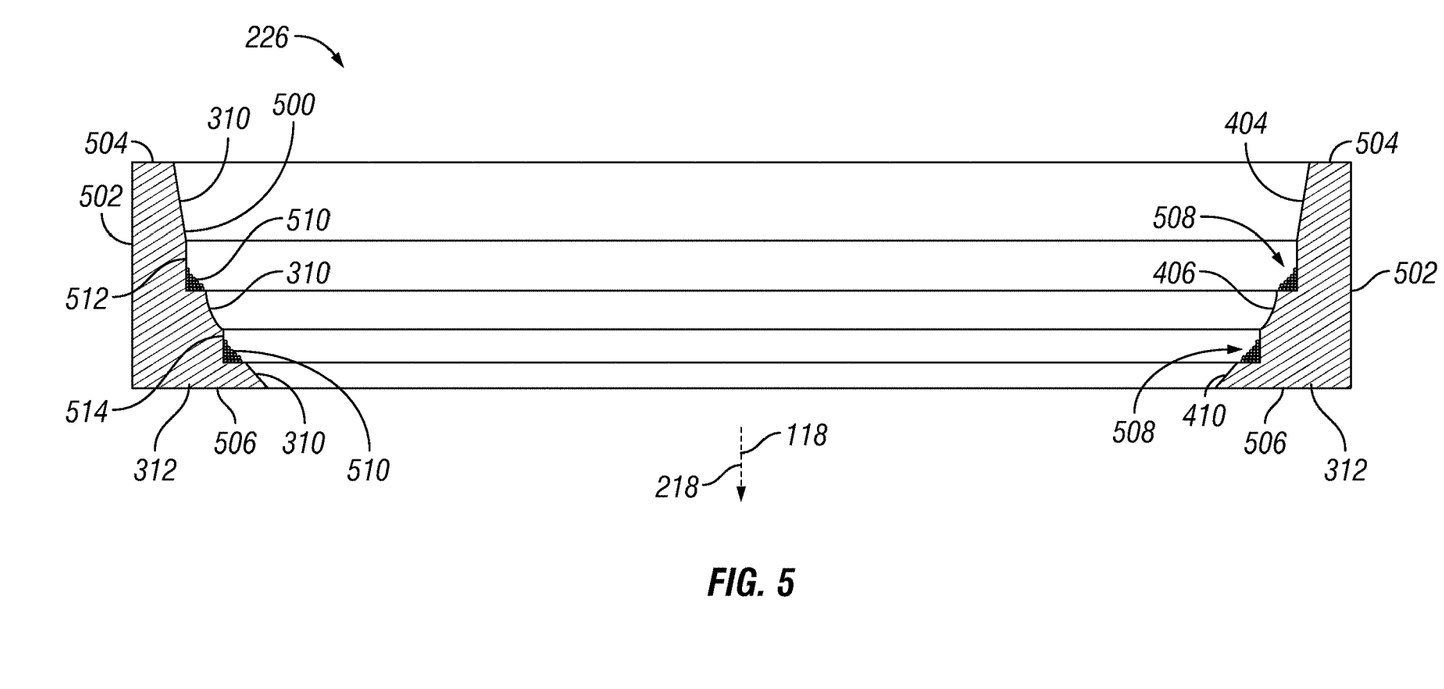
FIG. 5 is a cross-sectional view of a resilient radial seal having at least one recess.

FIG. 5 is a cross-sectional view of an embodiment of a resilient radial seal 226 having at least one annular recess 512. The annular body portion 312 may include a radially inner surface 500, a radially outer surface 502, a first axial seal surface 504 and a second axial seal surface 506. In the illustrated embodiment, the annular body portion 312 defines the plurality of sealing surfaces 310 (e.g., the first sealing surface 404, the second sealing surface 406, and the third sealing surface 410) in the radially inner surface 500 of the annular body portion 312. However, the plurality of sealing surfaces 310 may be defined in any suitable surface of the annular body portion 312 (e.g., the radially outer surface 502, the first axial seal surface 504) based at least in part on a form (e.g., shape) of the flapper 202 (shown in FIG. 3). For example, as set forth below, the annular body portion 312 may define the plurality of sealing surfaces 310 in the first axial seal surface 504 to interface with a flapper 202 having a flat sealing interface. In the illustrated embodiment, the annular body portion 312 defines the plurality of sealing surfaces 310 in the radially inner surface 500 to interface with a flapper 202 having an angled sealing surface (shown in FIG. 3).

Moreover, the annular body portion 312 may define a plurality of annular recesses 508 formed between adjacent sealing surfaces of the plurality of sealing surfaces 310. As set forth above, the production fluid 118 may include a mixture of crude oil, sand 510, and/or other debris. The plurality of annular recesses 508 may help prevent sand and/or other debris from becoming trapped between the flapper 202 and the plurality of sealing surfaces 310 when the flapper 202 moves to the closed position. For example, the flapper 202 may enter the resilient radial seal 226 from the first axial seal surface 504 side of the annular body portion 312. As the flapper 202 slides along the first sealing surface 404, any sand 510 and/or other debris present on the first sealing surface 404 may be pushed in a direction toward the second axial surface 506 and into a first annular recess 512. Further, as the flapper 202 continues to move toward the closed position, the flapper 202 may slide along the second sealing surface 406 and push any sand 510 and/or other debris present on the second sealing surface 406 into a second annular recess 514. Moreover, as the flapper 202 continues to move toward the closed position, the flapper 202 may slide along the third sealing surface 410 and push any sand 510 and/or other debris present on the third sealing surface 410 into the flow path 218 of the production fluid 118 disposed uphole the resilient seal 226. Thus, in some embodiments, the sealing surfaces 310 may self-clean as the flapper 202 moves into the closed position to help prevent the sand 510 and/or other debris from becoming trapped between the flapper 202 and the plurality of sealing surfaces 310. Further, when the flapper 202 moves into the open position, any sand 510 and/or other debris caught in the annular recesses 508 may be pulled out of the annular recesses 508 by the upward flow of production fluid 118 such that the plurality of annular recesses 508 may be substantially clear to receive the sand 510 and/or other debris for a subsequent closures of the flapper 202.

Figure 6A:
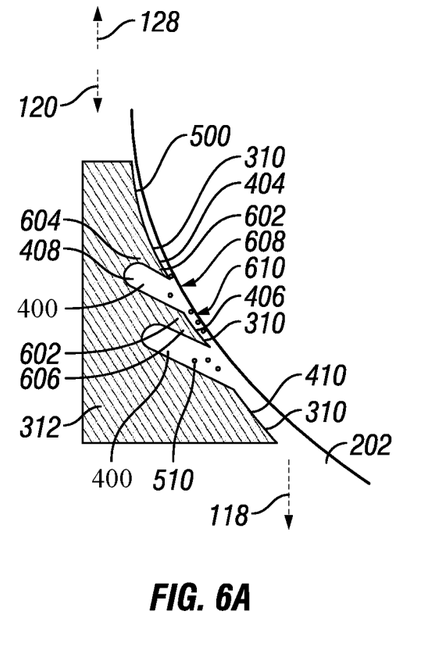
FIG. 6A is a cross-sectional view of a resilient radial seal with a flapper of the subsurface safety valve in a partially open position.

FIG. 6A is a cross-sectional view of an embodiment of the resilient radial seal 226 with a flapper 202 of the subsurface safety valve 126 in a partially open position. As illustrated, the annular body portion 312 defines a plurality of sealing surfaces 310 (e.g., the first sealing surface 404, the second sealing surface 406, and the third sealing surface 410) in the radially inner surface 500 of the annular body portion 312. Further, the annular body portion 312 defines a plurality of channels 400 that extend into the annular body portion 312 between adjacent sealing surfaces 310. The plurality of channels 400 may extend into the annular body portion 312 at an angle with respect to the adjacent sealing surfaces 310. However, in some embodiments, the plurality of channels 400 may extend into the annular body in a direction substantially normal to the adjacent sealing surfaces 310. Moreover, the plurality of channels 400 may be oriented at least partially in a uphole direction. Having the plurality of channels 400 oriented at least partially in a uphole direction 120 may minimize an amount of the sand 510 that enters into the plurality of channels 400 from the production fluid 118 flowing in the uphole direction 120. Further, as the plurality of channels 400 are oriented in the direction of the flow of the production fluid 118, any sand 510 and/or other debris that enters the plurality of channels 400 may be pulled out of the channels 400 by the flow of production fluid 118 such that the plurality of channels 400 remain adequately free of the sand 510 and/or debris.

In the illustrated embodiment, the annular body portion 312 includes a plurality of ridges 602 that support the plurality of sealing surfaces 310. For example, a first ridge 604 may support the first sealing surface 404 and a second ridge 606 may support the second sealing surface 406. The ridges 400 (e.g., protrusions) may be formed adjacent the plurality of channels 400. In particular, each ridge of the plurality of ridges 400 may be formed in a portion of the annular body portion 312 disposed downhole 128 from a corresponding channel of the plurality of channels 400. The ridges 400 may be flexible to deflect in response to forces exerted on sealing surfaces 310 corresponding to the ridges 400. In some embodiments, the flapper 202 may be configured to exert force on the sealing surfaces 310 to deflect the ridges 400. For example, the annular body portion 312 may include the first ridge and the second ridge offset from each other with respect to the flapper 202 such that the first ridge 604 contacts the flapper 202 before the second ridge 606 as the flapper 202 moves to the closed position of the flapper 202 (shown in FIG. 6B). The first ridge 604 may deflect into an adjacent channel 400 or groove disposed in the uphole direction 120 from the first ridge (e.g., the first annular channel 408) in response to force exerted from the flapper 202 on the first sealing surface 404. Pre-loading the first ridge 604 by deflecting the first ridge 604 may form a stronger seal between the first sealing surface 404 and the flapper 202 than a seal between the flapper 202 and a non-pre-loaded sealing surface.

Figure 6B:
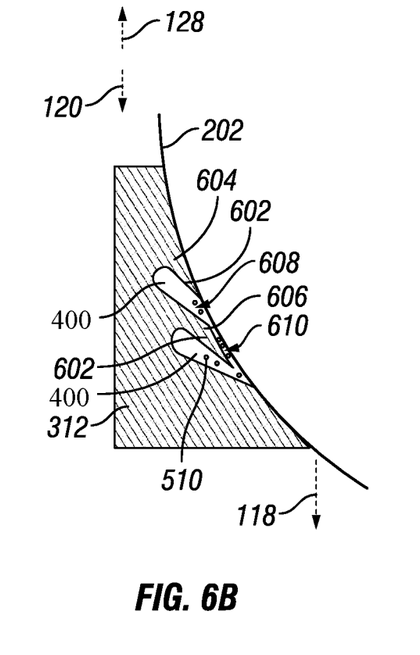
FIG. 6B is a cross-sectional view of the resilient radial seal with the flapper in a partially closed position.

In some embodiments, at least one ridge of the plurality of ridges 602 may deflect in response to a force exerted on the ridge from the flapper 202 via a sand particle 510 and/or other debris such that other sealing surfaces 310 may still seal against the flapper 202 in the closed position (shown in FIG. 6B). Referring to FIG. 6A, the flapper 202 is moving from the open position to the closed position. As illustrated, the sand particles 510 may be positioned between the plurality of sealing surfaces 310 and the flapper 202. For example, a first group 608 of sand particles 510 may be positioned between the first sealing surface 404 and the flapper 202 and a second group 610 of sand particles 510 may be positioned between the second sealing surface 406 and the flapper 202. As the flapper 202 moves to the closed position, the sand particles 510 may become trapped between the sealing surfaces 310 and the flapper 202.

FIG. 6B is a cross-sectional view of an embodiment of the resilient radial seal 226 with the flapper 202 of the subsurface safety valve 126 in the closed position. As illustrated, the first group 608 of sand particles 510 is disposed within the first annular channel 408 adjacent the first sealing surface 404. As the flapper 202 moved into the closed position, the first ridge 604 may have deflected into the first annular channel 408. As the first group 608 of sand particles 510 was disposed proximate the edge of the first sealing surface 404 adjacent the first annular channel 408, the first group 608 of sand particles 510 may have slid off of the first sealing surface 404 into the first annular channel 408 when the first ridge 604 deflected into the first annular channel 408. As the first group 608 of sand particles 510 moved out of the space between the first sealing surface 404 and the flapper 202, the first ridge 604 may have rebounded toward the flapper 202, such that the first sealing surface 404 is sealed against the flapper 202 in the closed position.

Moreover, the second group 610 of sand particles 510 remains trapped between the second sealing surface 406 and the flapper 202 in the closed position. Generally, having the second group 610 of sand particles 510 trapped between the second sealing surface 406 and the flapper 202 may have prevented the flapper 202 from fully sealing against other sealing surfaces 310 (e.g., the first sealing surface 404 and the second sealing surface 406). However, as the ridges 602 are configured to deflect, the second ridge 606 corresponding to the second sealing surface 406 deflected into the second annular channel 412 in response to the force on the second sealing surface 406 exerted by the flapper 202 via the second group 610 of sand particles 510. With the second ridge 606 deflected into the second annular channel 412, the first sealing surface 404 and the third sealing surface 410 may still adequately seal against the flapper 202.

Figure 7:
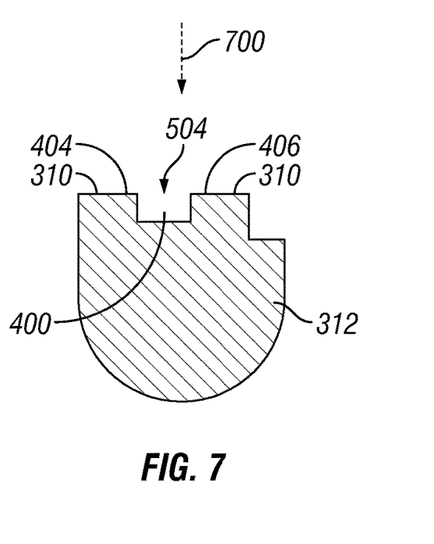
FIG. 7 is a cross-sectional view of a resilient face seal of the subsurface safety valve.

FIG. 7 is a cross-sectional view of an embodiment of the resilient face seal 226 of the subsurface safety valve 126. The annular body portion 312 may define the plurality of sealing surfaces 310 (e.g., the first sealing surface 404 and the second sealing surface 406) in the first axial seal surface 504 of the annular body portion 312. As set forth above, the plurality of sealing surfaces 310 may be defined in the first axial seal surface 504 to interface with a flapper 202 having a flat sealing interface. Further, the annular body portion 312 may define the at least one annular channel 400 that extends into the annular body portion 312 between adjacent sealing surfaces 310 (e.g., the first sealing surface 404 and the second sealing surface 406). The at least one annular channel 400 may extend into the annular body portion 312 in a direction substantially normal 700 to adjacent sealing surfaces 310 of the plurality of sealing surfaces 310. Moreover, the at least one annular channel 400 may include a uniform cross-section. However, in some embodiments, the at least one annular channel 400 may include a non-uniform cross section. Further, in some embodiments, the at least one channel 400 may be discontinuous around a circumference of the annular body portion 312. For example, the at least one channel 400 may include a plurality of intermittent channels 400 disposed along the circumference of the annular body portion 312.

Figure 8:
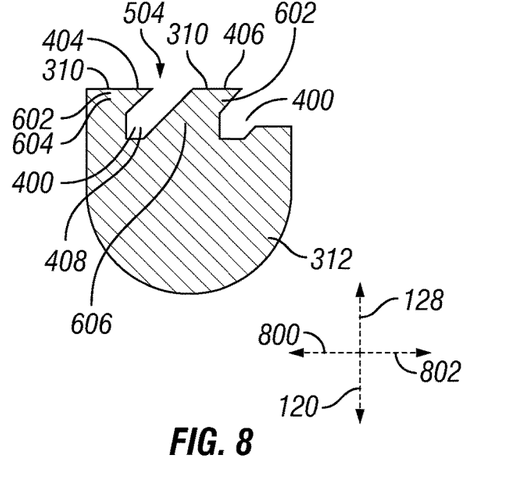
FIG. 8 is a cross-sectional view of a resilient face seal with angled grooves.

FIG. 8 is a cross-sectional view of an embodiment of the resilient face seal 226 with angled grooves 900. In the illustrated embodiments, the annular body portion 312 defines a plurality of sealing surfaces 310 (e.g., the first sealing surface 404 and the second sealing surface 406) in the first axial seal surface 504 of the annular body portion 312. Further, the annular body portion 312 defines a plurality of channels 400 or grooves that extend into the annular body portion 312 between adjacent sealing surfaces 310. Moreover, the annular body portion 312 includes the plurality of ridges 602 that support the plurality of sealing surfaces 310. For example, the first ridge 604 may support the first sealing surface 404 and the second ridge 606 may support the second sealing surface 406. The ridges 602 (e.g., protrusions) may be formed adjacent the plurality of channels 400. In particular, each ridge of the plurality of ridges 602 may be formed in portions of the annular body portion 312 disposed at least partially radially outward 800 from a corresponding channel of the plurality of channels 400. However, in some embodiments, each ridge of the plurality of ridges 602 may be formed in portions of the annular body portion 312 disposed at least partially radially inward 802 from a corresponding channel of the plurality of channels 400. The ridges 602 may be flexible to deflect in response to forces exerted on sealing surfaces 310 corresponding to the ridges 602.

Moreover, the plurality of channels 400 may extend into the annular body portion 312 at an angle with respect to the adjacent sealing surfaces 310. As illustrated, the plurality of channels 400 may extend into the annular body portion 312 at an angle such that at least a portion of an adjacent ridge 602 and sealing surfaces 310 is disposed above (e.g., downhole 128) a corresponding channel 400 such that the ridge 602 may deflect into the channel 400 in response to an axial force on the sealing surfaces 310. In particular, the positioning of the channel 400 under the ridge 602 (i.e., uphole 120 from the ridge 602) may allow the ridge 602 to axially deflect into the channel 400. In some embodiments, the ridge 602 may both axially and radially deflect into the channel 400. Moreover, the ridge 602 may deflect in response to sand particles 510 becoming trapped between the sealing surfaces 310 and the flapper 202. For example, the first ridge 604 may deflect into the first annular channel 408 in response to sand particles 510 being trapped between the first sealing surface 404 and the flapper 202 such that the flapper 202 may still contact the second sealing surface 406 to form an adequate seal between the seal 226 and the flapper 202.

Figure 9A:
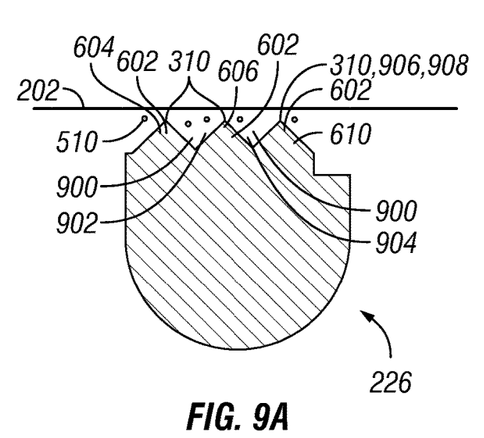
FIG. 9A is a cross-sectional view of a resilient face seal with a flapper of the subsurface safety valve in a partially open position.

FIG. 9A is a cross-sectional view of an embodiment of the resilient face seal 226 with the flapper 202 of the subsurface safety valve 126 in the partially open position. As illustrated, the resilient seal 226 has a corrugated sealing face with a plurality of ridges 602 and at least one groove 900. Specifically, the resilient seal 226 has the first ridge 604 separated from the second ridge 606 by a first groove 902 and the second ridge 606 separated from a third ridge 612 by a second groove 904. The plurality of sealing surfaces 310 of the resilient seal 226 may be disposed or formed at corresponding distal ends 906 of the plurality of ridges 602. In the partially open position, each ridge of the plurality of ridges 602 of the resilient seal 226 has a substantially triangular cross section with a corner 908 of the triangular cross-section positioned at the distal end 906 of the ridge. As such, the sealing surfaces 310 may have a minimal surface area in the open position of the flapper 202, which may prevent sand 510 and/or other debris from accumulating on the sealing surfaces 310 before engagement with the flapper 202. Indeed, as the flapper 202 moves toward the closed position, the sand 510 and/or other debris positioned between the flapper 202 and the sealing surfaces 310 may be guided into the grooves 900 between the ridges 602.

Figure 9B:
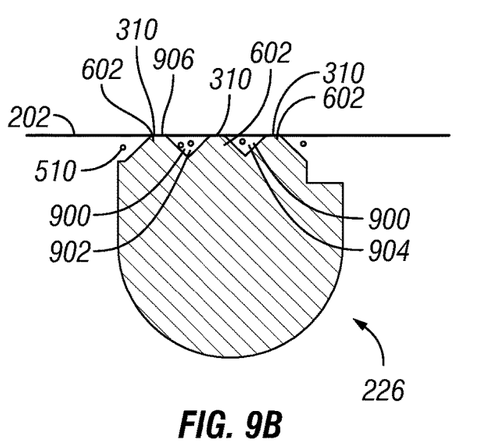
FIG. 9B is a cross-sectional view of the resilient face seal with a flapper of the subsurface safety valve in a partially closed position.

FIG. 9B is a cross-sectional view of an embodiment of the resilient face seal 226 with the flapper 202 of the subsurface safety valve 126 in the closed position. Each ridge of the plurality of ridges 602 is flexible such that it may deflect in response to force on the corresponding distal end 906 of the ridge 602. In response to the flapper 202 contacting the distal ends 906 of the ridges 602, the distal ends 906 (e.g., corners 908) may deflect and flatten to form the plurality of sealing surfaces 310. As illustrated, the distal ends 906 flatten to form the plurality of sealing surfaces 310 with sufficient surface area contact with the flapper 202 to adequately seal the resilient seal 226 against the flapper 202.

Accordingly, the present disclosure the subsurface safety valve may include resilient seals configured to maintain an adequate seal to prevent upward flow of production fluid between the flapper and the valve seat even when sand or other debris is positioned between the resilient seal and the flapper and/or valve seat as the flapper moves into the closed position.

The methods/systems/compositions/tools may include any of the various features disclosed herein, including one or more of the following statements.

Statement 1. A resilient seal may comprise an annular body portion; a seating surface defined by the annular body portion configured to interface with a seat of a subsurface safety valve; a plurality of sealing surfaces defined by the annular body portion, wherein each sealing surface of the plurality of sealing surfaces is positioned to interface with a flapper of the subsurface safety valve in a closed position of the flapper of the subsurface safety valve; and at least one annular channel defined by the annular body portion between adjacent sealing surfaces of the plurality of sealing surfaces.

Statement 2. The resilient seal of statement 1, wherein a first ridge and a second ridge are offset from each other with respect to the flapper such that the first ridge contacts the flapper before the second ridge as the flapper moves to the closed position of the flapper.

Statement 3. The resilient seal of statement 1 or 2, wherein each sealing surface of the plurality of sealing surfaces is an annular sealing surface.

Statement 4. The resilient seal of any of statements 1-3, wherein each sealing surface of the plurality of sealing surfaces is disposed at a radially inner surface of the annular body portion.

Statement 5. The resilient seal of any of statements 1-4, wherein the plurality of sealing surfaces is disposed at an axial end of the annular body portion.

Statement 6. The resilient seal of any of statements 1-5, wherein the at least one channel comprises a uniform cross-section.

Statement 7. The resilient seal of any of statements 1-6, wherein the at least one channel is configured to extend axially into the annular body portion.

Statement 8. The resilient seal of any of statements 1-7, wherein the at least one annular channel is configured to extend into the annular body portion in a direction substantially normal to adjacent sealing surfaces of the plurality of sealing surfaces.

Statement 9. The resilient seal of any of statements 1-8, wherein the at least one channel is configured to extend into the annular body portion at an angle with respect to the adjacent sealing surfaces, wherein at least a portion of the at least one channel is positioned under a corresponding sealing surface of the plurality of sealing surfaces.

Statement 10. The resilient seal of any of statements 1-9, wherein the at least one annular channel comprises a plurality of annular channels.

Statement 11. The resilient seal of any of statement 1-10, wherein the annular body portion comprises a Polytetrafluoroethylene material, a Polyether ether ketone (PEEK) material, or some combination thereof.

Statement 12. A subsurface safety valve system may comprise a production tube; a sleeve disposed within the production tube and configured to move axially with respect to the production tube between a first position and a second position; a spring configured to bias the sleeve toward the first position; a control line configured to provide fluid pressure to bias the sleeve toward the second position, wherein the control line is configured to provide an particular amount of fluid pressure based at least on a control system disposed at the surface of the wellbore; a seat secured to the production tube and extending radially inward with respect to the production tube, wherein the seat comprises a first axial end configured to support a downhole end of the spring, and wherein the seat comprises a second axial end positioned downhole with respect to the first axial end; a flapper configured to hinge between an open position and a closed positioned based at least in part on the position of the sleeve; and a resilient seal housed at the second axial end of the seat, the resilient seal having an annular body portion with a seating surface and a plurality of sealing surfaces, the seating surface configured to interface with the seat, and the plurality of sealing surfaces configured to interface with the flapper in the closed position.

Statement 13. The resilient seal of statement 12, wherein the resilient seal comprises a corrugated sealing face having a plurality of ridges and at least one groove, wherein each sealing surface of the plurality of sealing surfaces is disposed on a distal end of a corresponding ridge of the plurality of ridges.

Statement 14. The resilient seal of any of statements 12-13, wherein each ridge of the plurality of ridges is flexible and configured to deflect in response to force on the corresponding sealing surface.

Statement 15. The resilient seal of any of statements 12-14, wherein each ridge of the plurality of ridges is configured to deflect into a corresponding groove positioned adjacent the ridges in response to the force on the corresponding sealing surface.

Statement 16. The resilient seal of any of statements 12-15, wherein the each ridge of the plurality of ridges comprises a substantially triangular cross section with a corner of the triangular cross-section disposed at a distal end of the ridge, wherein at least a portion of the corner is configured to deflect and flatten to form the sealing surface in response to contact with the flapper.

Statement 17. The resilient seal of any of statements 12-16, wherein debris positioned between the sealing surface and the flapper is configured to exert the force on the corresponding sealing surface.

Statement 18. A method may comprise forming a resilient seal having an annular body portion with at least a seating surface and a sealing surface, wherein the resilient seal is configured to be positioned between a flapper and a sealing seat of a subsurface safety valve, wherein the seating surface is configured to interface with the sealing seat and the sealing surface is configured to interface with the flapper; and modifying the sealing surface of the resilient seal to form at least two sealing surfaces separated by at least one annular channel, wherein the at least one channel is formed by removing a portion of the sealing surface, wherein at least one of the at least two sealing surfaces is configured to interface with the flapper during operation.

Statement 19. The method of statement 18, wherein modifying the sealing surface includes forming a plurality of radially spaced sealing surfaces separated by a plurality of radially-spaced annular channels.

Statement 20. The method of statement 18 or 19, wherein modifying the sealing surface comprises drilling, milling, or some combination thereof, into the sealing surface of the resilient seal to form at least two sealing surfaces separated by at least one annular channel.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A resilient seal, comprising:
an annular body portion;
a seating surface defined by the annular body portion and configured to interface with a seat of a subsurface safety valve;
a plurality of sealing surfaces defined by the annular body portion, wherein each sealing surface of the plurality of sealing surfaces comprises a triangular cross-section in an open position of a flapper of the subsurface safety valve, wherein corresponding tips of each sealing surface of the plurality of sealing surfaces are positioned to interface with the flapper of the subsurface safety valve in a closed position of the flapper, and wherein the corresponding tips of each sealing surface are configured to deflect in response to contact with the flapper to flatten the sealing surfaces against the flapper; and
at least one annular channel defined by the annular body portion between adjacent sealing surfaces of the plurality of sealing surfaces.

2. The resilient seal of claim 1, wherein a first ridge and a second ridge are offset from each other with respect to the flapper such that the first ridge contacts the flapper before the second ridge as the flapper moves to the closed position of the flapper.

3. The resilient seal of claim 1, wherein each sealing surface of the plurality of sealing surfaces is an annular sealing surface.

4. The resilient seal of claim 1, wherein each sealing surface of the plurality of sealing surfaces is disposed at a radially inner surface of the annular body portion.

5. The resilient seal of claim 1, wherein the plurality of sealing surfaces is disposed at an axial end of the annular body portion.

6. The resilient seal of claim 1, wherein the at least one annular channel comprises a uniform cross-section.

7. The resilient seal of claim 1, wherein the at least one annular channel is configured to extend axially into the annular body portion.

8. The resilient seal of claim 1, wherein the at least one annular channel is configured to extend into the annular body portion in a direction substantially normal to adjacent sealing surfaces of the plurality of sealing surfaces.

9. The resilient seal of claim 1, wherein the at least one annular channel is configured to extend into the annular body portion at an angle with respect to adjacent sealing surfaces, wherein at least a portion of the at least one annular channel is positioned under a corresponding sealing surface of the plurality of sealing surfaces.

10. The resilient seal of claim 1, wherein the at least one annular channel comprises a plurality of annular channels.

11. The resilient seal of claim 1, wherein the annular body portion comprises a Polytetrafluoroethylene material, a Polyether ether ketone (PEEK) material, or some combination thereof.

12. A subsurface safety valve system, comprising:
a production tube;
a sleeve disposed within the production tube and configured to move axially with respect to the production tube between a first position and a second position;
a spring configured to bias the sleeve toward the first position;
a control line configured to provide fluid pressure to bias the sleeve toward the second position, wherein the control line is configured to provide a particular amount of fluid pressure based at least on a control system disposed at a surface of a wellbore;
a seat secured to the production tube and extending radially inward with respect to the production tube, wherein the seat comprises a first axial end configured to support a downhole end of the spring, and wherein the seat comprises a second axial end positioned downhole with respect to the first axial end;
a flapper configured to hinge between an open position and a closed position based at least in part on the position of the sleeve; and
a resilient seal housed at the second axial end of the seat, the resilient seal having an annular body portion with a seating surface and a corrugated sealing face having plurality of sealing surfaces, the seating surface configured to interface with the seat, and the plurality of sealing surfaces configured to interface with the flapper in the closed position, and wherein the corrugated sealing face includes a plurality of ridges and at least one groove, wherein each sealing surface of the plurality of sealing surfaces is disposed on a distal end of a corresponding ridge of the plurality of ridges, wherein each ridge of the plurality of ridges is flexible and configured to deflect into a corresponding groove positioned adjacent the ridge in response to a force on the corresponding sealing surface.

13. The resilient seal of claim 12, wherein debris positioned between the sealing surface and the flapper is configured to exert the force on the corresponding sealing surface.

14. The resilient seal of claim 12, wherein each ridge of the plurality of ridges comprises a substantially triangular cross-section with a tip of the triangular cross-section disposed at a distal end of the ridge, wherein at least a portion of the tip is configured to deflect and flatten against the flapper, in response to contact with the flapper, to form the corresponding sealing surface.

15. A method, comprising:
forming a resilient seal having an annular body portion with at least a seating surface and a sealing surface, wherein the resilient seal is configured to be positioned between a flapper and a sealing seat of a subsurface safety valve, wherein the seating surface is configured to interface with the sealing seat and the sealing surface is configured to interface with the flapper; and
modifying the sealing surface of the resilient seal to form at least two sealing surfaces separated by at least one annular channel, wherein the at least one annular channel is formed by removing a portion of the sealing surface, wherein the at least two sealing surfaces comprise triangular cross-sections in an open position of the flapper, wherein corresponding tips of the at least two sealing surfaces are configured to interface with the flapper in a closed position of the flapper, and wherein corresponding tips of the at least two sealing surfaces are configured to deflect in response to contact with the flapper to flatten the at least two sealing surfaces against the flapper.

16. The method of claim 15, wherein modifying the sealing surface includes forming a plurality of radially spaced sealing surfaces separated by a plurality of radially-spaced annular channels.

17. The method of claim 15, wherein modifying the sealing surface comprises drilling, milling, or some combination thereof, into the sealing surface of the resilient seal to form at least two sealing surfaces separated by at least one annular channel.

* * * * *